United States Patent
Schlösser

[11] Patent Number: 6,016,628
[45] Date of Patent: Jan. 25, 2000

[54] PLANT GROWTH BAG FOR USE IN A FLOWER BOX

[75] Inventor: Ulrich Schlösser, Pfaffenhofen, Germany

[73] Assignee: Lothar Dedden, Bad Zwischenahn, Germany

[21] Appl. No.: 08/913,289
[22] PCT Filed: Jan. 31, 1996
[86] PCT No.: PCT/DE96/00133
§ 371 Date: Oct. 27, 1997
§ 102(e) Date: Oct. 27, 1997
[87] PCT Pub. No.: WO96/25844
PCT Pub. Date: Aug. 29, 1996

[30] Foreign Application Priority Data

Feb. 23, 1995 [DE] Germany ........................ 295 03 009 U

[51] Int. Cl.⁷ .............................................. A01G 9/02
[52] U.S. Cl. ............................................ 47/65.8; 47/65.7
[58] Field of Search ...................... 47/65.5, 65.7, 47/65.8; 428/34.7

[56] References Cited

U.S. PATENT DOCUMENTS

| | | | |
|---|---|---|---|
| 3,733,745 | 5/1973 | Ingerstedt et al. | 47/37 |
| 4,006,561 | 2/1977 | Thoma et al. | 47/58 |
| 4,209,945 | 7/1980 | Dent et al. | 47/84 |
| 4,287,682 | 9/1981 | Browne | 47/81 |
| 5,074,416 | 12/1991 | Hustad | 206/524.8 |
| 5,077,064 | 12/1991 | Hustad et al. | 426/106 |
| 5,241,783 | 9/1993 | Krueger | 47/66 |
| 5,363,592 | 11/1994 | Weder et al. | 47/58 |
| 5,582,853 | 12/1996 | Marnocha et al. | 426/122 |
| 5,624,030 | 4/1997 | Rademacher | 206/386 |
| 5,773,105 | 6/1998 | Klett | 428/34.7 |

FOREIGN PATENT DOCUMENTS

| | | |
|---|---|---|
| 0 403 348 | 6/1990 | European Pat. Off. . |
| 0 476 828 | 8/1991 | European Pat. Off. . |
| 0 504 762 A1 | 3/1992 | European Pat. Off. . |
| 2 601 227 | 7/1986 | France . |
| 2 691 875 | 6/1992 | France . |
| 2 712 140 | 11/1993 | France . |
| 295 03 009 U | 7/1995 | Germany . |
| 2020224 | 1/1990 | Japan . |
| 2 252 028 | 1/1991 | United Kingdom ................. 9/2 |
| WO 87 02327 | 10/1986 | WIPO . |

Primary Examiner—Michael J. Carone
Assistant Examiner—Fredrick T. French, III
Attorney, Agent, or Firm—Darby & Darby

[57] ABSTRACT

A planting substrate in the form of a soil-like mixture for flower boxes (10) is characterized in that the planting substrate is available filled in a bag (12), the bag skin of which consists of a plastic foil which has poor transparency and is water-permeable from the outside, and the shape of the bag (12) is or can be adapted to the inner cross-section of the flower box (10) in such a manner that the bag (12) has room in the flower box (10) in terms of size.

6 Claims, 2 Drawing Sheets

PLANT GROWTH BAG FOR USE IN A FLOWER BOX

TECHNICAL FIELD

The invention relates to a planting bag filled with planting substrate, in which pot plants and in particular balcony plants thrive. The planting bag can be filled with compost, peat, peat mixtures or other planting bases and substrates of any composition.

STATE OF THE ART

For stocking planting containers such as for example flower boxes which are located on balcony walls or balcony railings, it is known to fill suitable composts and similar planting substrates loosely into the flower boxes. Subsequently, the plants desired in each case are inserted into the compost. In particular the mess caused during filling the planting containers is quite considerable, which is most undesirable where balconies are concerned. The same mess is created again when the planting containers are emptied. In the case of annual plants, which are often used to make balconies look attractive, this is doubly unfavourable. Apart from the mess created, there is also a weight problem. Compost is available on the market in relatively large packs. To the extent that these relatively large packs have to be carried to the respective planting containers, this is possible only with difficulty for elderly persons because of the weight. Furthermore, the quantity in the pack is not identical with the quantity required in each individual case and compost is therefore left over, which is uneconomical.

DESCRIPTION OF THE INVENTION

Starting out from this known state of the art, the object of the invention is to indicate an improved possibility for stocking planting containers, in particular flower boxes.

This invention is characterized by the features of the main claim. The invention starts out from the recognition that the abovementioned disadvantages can be avoided by using so-called planting bags, the inside of which is filled with the planting substrate required in each case, such as for example the corresponding compost, and the external sizes of which are adapted to the various flower boxes or other planting containers.

On the one hand, it is in each case necessary to purchase only the specific quantity of planting substrate necessary for filling the respective planting container and, on the other hand, the procedure of filling the planting container can be effected without great effort and in particular without making a mess because the planting bag purchased on the market merely has to be inserted into the appropriate flower box or other planting container.

According to the invention, the bag skin used for the planting bag has particularly poor transparency but allows air to circulate. Moreover, this skin is water-permeable from outside to inside but on the other hand it is more difficult for water to permeate from inside to outside. This bag skin therefore prevents rapid drying out of the compost, of the peat, of the peat mixture or of the other planting bases and substrates present in the bag. Drying out of the surface of the compost, which can often occur in flower boxes on relatively high balconies in particular, is not possible either because the compost is protected inside the skin.

As a result of the fact that the wind cannot affect the compost directly, it is also ensured, in addition to the drying out of the compost being prevented, that the compost cannot be blown out of the flower box. There is therefore no risk of soil then missing from the flower box or of a mess being caused by blown-out compost either.

For easier handling, a carrying handle can, according to an improvement of the invention, be firmly attached to the planting bag, the skin of which can consist of a suitable plastic foil. This handle can consist of the same material as the bag skin.

For insertion of the plants, a reclosable opening can be formed in the bag skin. This opening can, with a touch-and-close fastener for example, be closed as often as required. On the other hand, slits or holes can be cut into the upper side of the planting bag, through which the plants, seeds or cuttings can be inserted. The plants can grow out of the bag through these slits and holes without difficulty. The slits and holes constitute the points then at which plants are intended to be located in the planting container or flower box. The slits or holes can be arranged at any point by the user.

According to an important improvement of the invention, the bag skin can also have the shape of a gusseted bag. The gusseted-bag shape has the advantage that compost can be filled in through its opening without difficulties. In the filled state, the gusseted bag then essentially completely fills the inner space of the respective planting container. By virtue of its characteristic longitudinal folds, the gusseted-bag shape makes it possible to form a trough. When the planting bag or its contents are watered, a water bath can form in the trough. The result of this is that during watering the water does not run past to no avail on the outside of the bag skin. The gusseted bag is therefore advantageously inserted into the planting container in such a manner that its trough faces upwards. The gusseted bag can be closed by folding the gusseted-bag wall over one or more times, as is known in the case of gusseted bags. It is also possible, however, to provide closure aids in this connection, such as for example touch-and-close fasteners or other known aids, in order to prevent unintentional opening of the gusseted bag.

The bag skin thus has a number of functions. On the one hand it serves as packaging for the respective compost or other soil-like planting mixtures required. On the other hand it serves as protection for the planting mixture inside the respective planting container. In this way, it prevents compost falling or being blown out of the planting bag and on the other hand also prevents rapid drying out of plants planted in the compost. As a result, less watering is necessary than if the compost were exposed in flower boxes. This is because the bag skin acts like a unilaterally water-permeable membrane as it allows water through from outside to inside but is difficult for water to permeate from inside to outside. As, moreover, the foil has poor transparency, weed growth is impeded. Plant growth therefore takes place virtually exclusively in the region of the slits and holes. This is because the bag skin prevents weed plants growing out of the bag in the closed region of its skin. The bag skin can be passed through by plants only in the region of the existing slits and holes.

Further advantageous embodiments and improvements of the invention can be inferred from the exemplary embodiment below.

BRIEF DESCRIPTION OF THE DRAWING

The invention is described and explained in greater detail below with reference to the exemplary embodiment illustrated in the drawing, in which.

METHODS OF EMBODYING THE INVENTION

Figure 1:
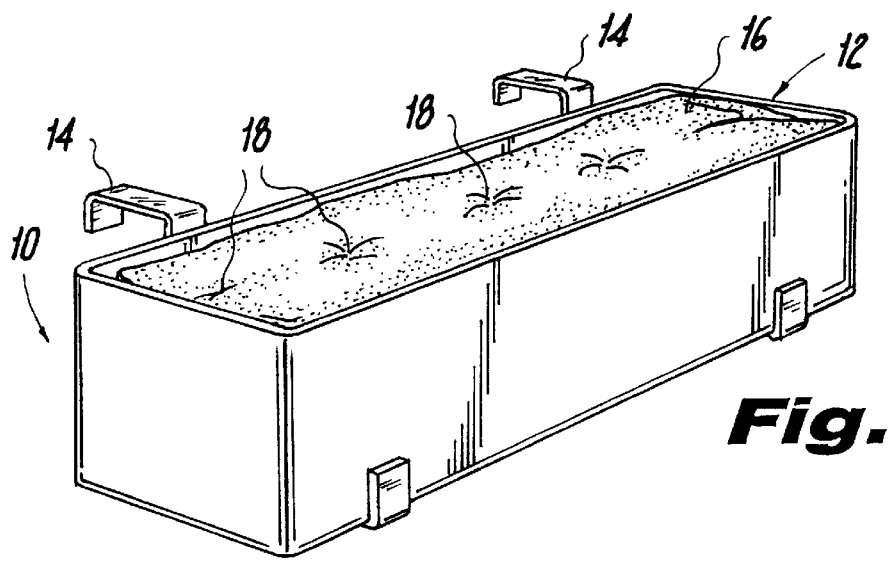
FIG. 1 shows a perspective view of a flower box with a planting bag according to the invention inserted.

A planting bag 12 is laid in a standard flower box 10. The planting bag 12 fills the interior of the flower box 10 essentially completely. The flower box 10 can be fastened on a balcony railing in a manner known per se by means of supports 14.

A number of slits 18 are cut into the upper side 16 of the planting bag 12. Cuttings or seeds can be inserted from above through the slits 18 into the interior of the planting bag 12.

Figure 2:
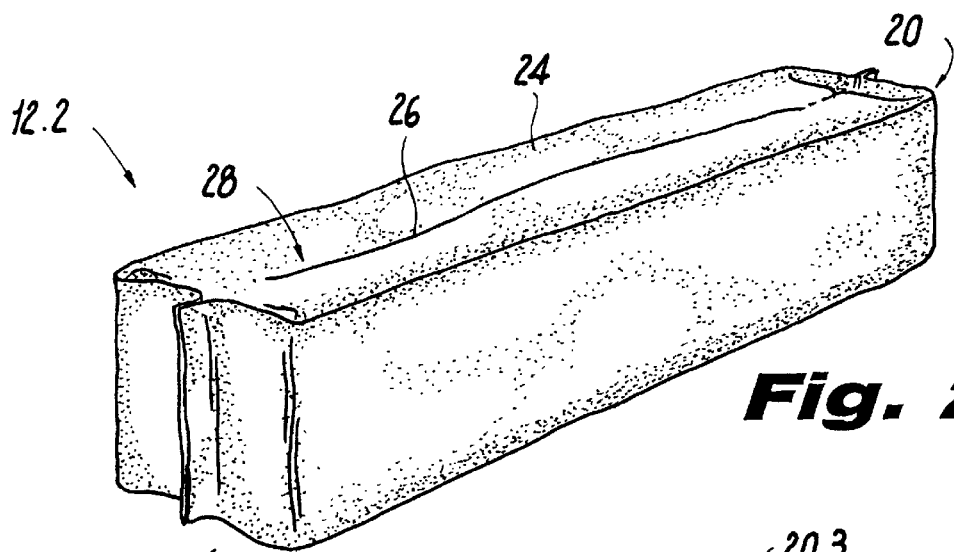
FIG. 2 shows a perspective view of a planting bag.

The planting bag 12 has for example a bag shape 12.2 illustrated in FIG. 2. This bag 12.2 constitutes a type of gusseted bag, the right and left narrow sides 20, 22 of which have a gusseted-bag closure which is known per se. The upwardly facing side surface 24, which corresponds to the upper side 16 of the planting bag 12 according to FIG. 1, has a concavity 28 provided with a longitudinal fold 26. This concavity 28 forms a type of trough and makes possible improved watering of the plants located in the planting bag 12. This is because watering water can accumulate in the concavity 28 and then penetrate the upper side 16 or side surface 24 into the interior of the planting bag. This watering water therefore does not flow past on the outside of the bag downwards into the bottom region of the flower box 10. In the inserted state, the projecting seams of the gusseted bag 12.2 are folded over onto the corresponding side surfaces.

Figure 3:
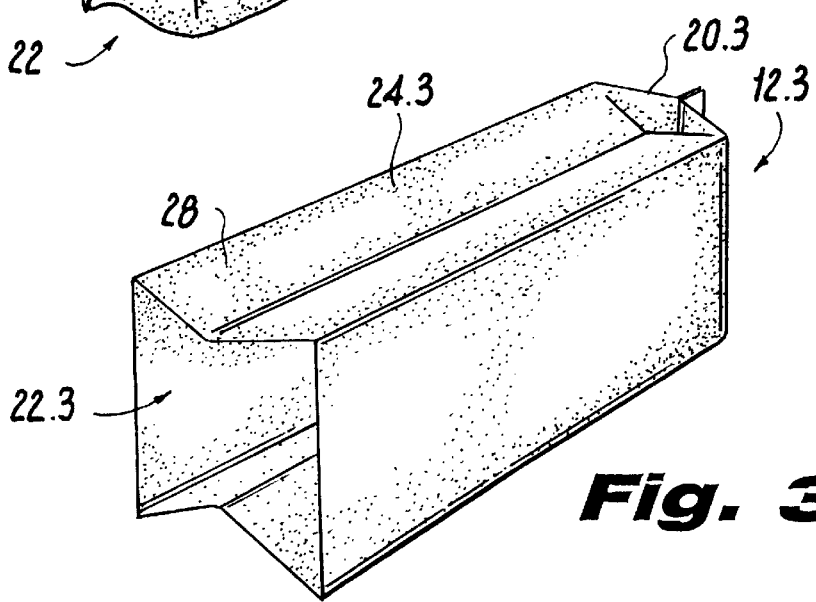
FIG. 3 shows a perspective view of a second embodiment of a planting bag.

In contrast to the bag shape 12.2, a closable gusseted-bag opening is formed on only the right narrow side 20.3 in the bag shape 12.3 illustrated in FIG. 3. The opposite narrow side 22.3 constitutes the closed bottom fold which is known per se of a gusseted bag. The concavity 28 is once again formed on the upwardly facing side surface 24.3 in this bag shape 12.3 also.

Figure 4:
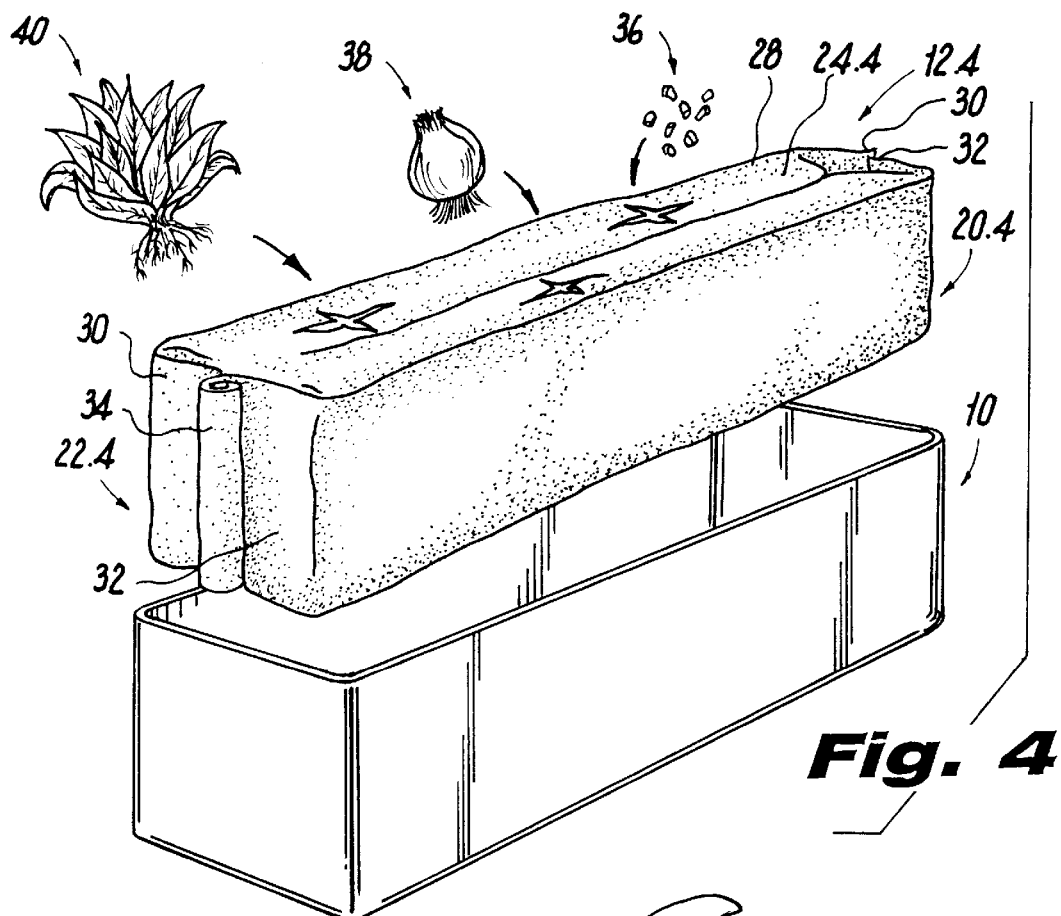
FIG. 4 shows a perspective view of a third embodiment of a planting bag prepared for insertion in a flower box.

The bag shape 12.4 illustrated in FIG. 4 also has said concavity 28 on its upwardly facing side surface 24.4. Its right narrow side 20.4 is closed in the manner of the closures illustrated in FIGS. 2 and 3. These closures are formed by flat superposition of the two end regions 30, 32 of the corresponding side walls. On the opposite narrow side 22.4, the side wall regions are rolled inside one another and thus constitute a loop-type closure 34. Seed grains 36, flower bulbs 38 or plants 40 can be planted through the slits 18 which are cut into the side surface 24.4 and in the present example are star-shaped. Planting is preferably carried out when the planting bag has already been inserted in the flower box 10.

Figure 5:
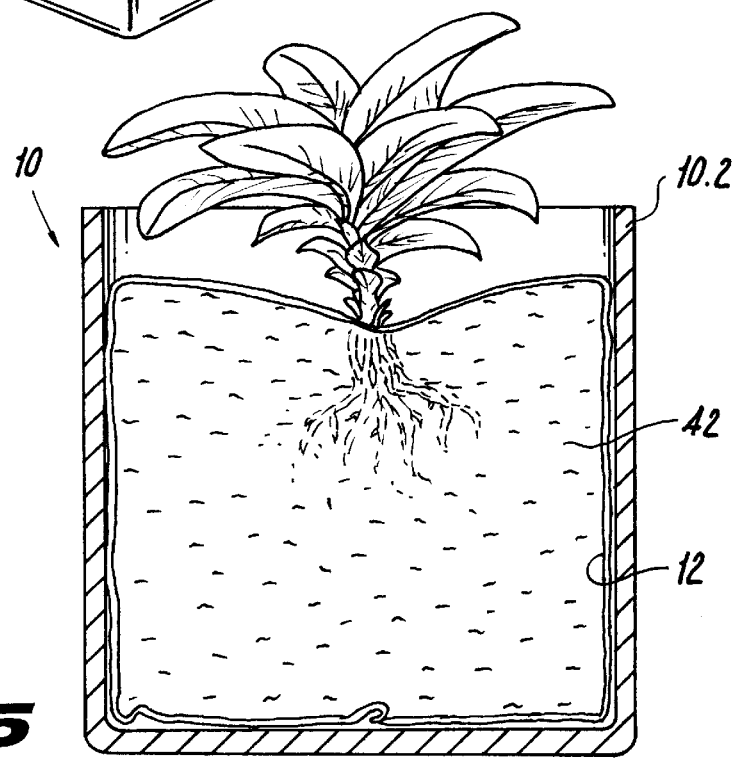
FIG. 5 shows a section through the flower box in FIG. 1.

A planting bag 12 filled with compost 42 is illustrated in FIG. 5. This planting bag 12 fills the inner space of the flower box 10 essentially completely. A free space exists only in the upper edge region 10.2 of the flower box 10. As a result of this, the planting bag 12 is to some extent hidden from view in the flower box 10.

I claim:

1. A planting substrate for use in a flower box, said planting substrate comprising:

a bag having an outer skin made of a plastic material, the bag being shaped to substantially conform to an inner cross-section of the flower box; and a soil being disposed within said bag, wherein the outer-skin has poor transparency, is water-permeable from outside to inside and is not readily water-permeable from inside to outside.

2. The planting substrate according to claim 1, further comprising a carrying handle being fastened to the bag.

3. The planting substrate according to claim 1, wherein the bag has at least one re-closable opening.

4. The planting substrate according to claim 3, wherein the bag opening is a touch-and-close fastener.

5. The planting substrate according to claim 1, wherein the bag is a gusseted bag.

6. The planting substrate according to claim 1, wherein the bag fills an inner space of the flower box essentially completely.

* * * * *